(12) United States Patent
Hoover et al.

(10) Patent No.: US 9,245,026 B1
(45) Date of Patent: Jan. 26, 2016

(54) INCREASING THE RELEVANCY OF SEARCH RESULTS ACROSS CATEGORIES

(71) Applicant: Amazon Technologies, Inc., Reno, NV (US)

(72) Inventors: Thomas Jay Hoover, Seattle, WA (US); Adam Callahan Sanders, Seattle, WA (US); Stefan Schroedl, San Francisco, CA (US)

(73) Assignee: Amazon Technologies, Inc., Reno, NV (US)

(*) Notice: Subject to any disclaimer, the term of this patent is extended or adjusted under 35 U.S.C. 154(b) by 206 days.

(21) Appl. No.: 13/927,994

(22) Filed: Jun. 26, 2013

(51) Int. Cl.
*G06F 17/30* (2006.01)

(52) U.S. Cl.
CPC .............................. *G06F 17/30864* (2013.01)

(58) Field of Classification Search
USPC ................................................. 707/706, 715
See application file for complete search history.

(56) References Cited

U.S. PATENT DOCUMENTS

| 7,743,045 B2 * | 6/2010 | Guha ............................ 707/706 |
|---|---|---|
| 7,962,461 B2 * | 6/2011 | Ruhl et al. .................... 707/706 |
| 7,970,750 B2 * | 6/2011 | Goel et al. .................... 707/706 |
| 7,984,035 B2 * | 7/2011 | Levin et al. ................... 707/706 |
| 8,108,255 B1 * | 1/2012 | Robinson et al. .......... 705/14.44 |
| 8,117,085 B1 * | 2/2012 | Smith .......................... 705/26.7 |
| 8,161,030 B2 * | 4/2012 | Ruhl et al. .................... 707/706 |
| 8,380,694 B2 * | 2/2013 | Ruhl et al. .................... 707/706 |
| 8,463,764 B2 * | 6/2013 | Fujioka et al. ............... 707/706 |
| 2013/0080422 A1 * | 3/2013 | Pan ............................. 707/722 |
| 2013/0212110 A1 * | 8/2013 | Stankiewicz et al. ......... 707/740 |

* cited by examiner

*Primary Examiner* — Kim Nguyen
(74) *Attorney, Agent, or Firm* — Kilpatrick Townsend & Stockton LLP

(57) ABSTRACT

Method and systems personalizing the search results presented to a user in an electronic marketplace. Data for a search query in an electronic marketplace is received. The query is executed and search results are received. Scores are calculated each item in the search result based at least in part on at least one of global navigational data and personal navigational data. Each item is allocated a position in an ordered search result list based at least in part on the scores. When at least some subset of the items in the search result list have been scored and allocated a position in the ordered search result list, the ordered search result list may be presented to the user.

22 Claims, 9 Drawing Sheets

INCREASING THE RELEVANCY OF SEARCH RESULTS ACROSS CATEGORIES

BACKGROUND

Search engines are powerful tools for locating information in a variety of contexts. For instance, a consumer in an electronic marketplace seeking to purchase a particular item may enter and submit one or more words, also known as keywords, describing the item, into an interface of a search engine in order to locate information about the item and/or purchase the item. The search engine may then provide the consumer with search results determined to be relevant, based at least in part on the keywords entered. The consumer may then search through the search results to locate what the consumer was looking for. The search results are provided to the consumer as a list or another format of items, with each item in the search result typically being represented by some amount of information regarding the item.

While search engines employ various methods for increasing the relevance of search results provided to people searching, the keywords entered by a person often relate to multiple categories of items offered by the electronic marketplace. For instance, in an electronic marketplace, a search for "Harry Potter" may relate to items belonging to multiple categories including such categories as DVDs, books, costumes, home decor, etc. Currently, search results are presented to the person with minimal consideration of what items are most relevant to the particular person.

BRIEF DESCRIPTION OF THE DRAWINGS

Various embodiments in accordance with the present disclosure will be described with reference to the drawings, in which.

DETAILED DESCRIPTION

Figure 1:
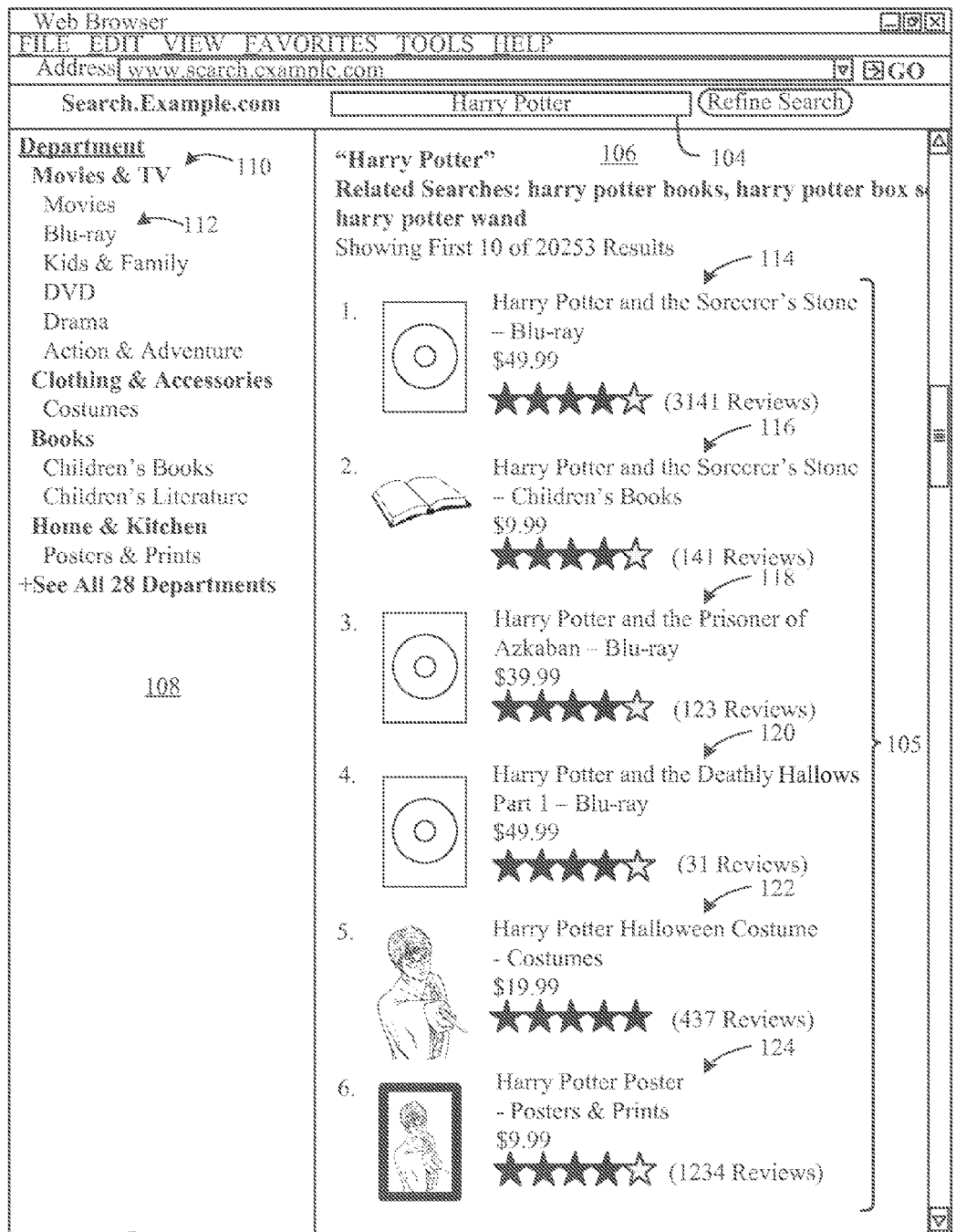
FIG. 1 illustrates an example of a search engine interface displaying an ordered search result list personalized to a user in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described herein are directed to placing search result items associated with various item categories into an ordered search result list personalized for a particular user. Such search results can be provided, for example, in response to a search query in an electronic marketplace. As used herein, the term "index" refers to an item category or an item sub-category. Examples of item categories include, but are not limited to, "Movies & TV," "DVDs," "Books," "Clothing & Accessories" and "Home & Kitchen," to name a few. Examples of item sub-categories include, but are not limited to, "Children's Books," a sub-category of "Books," "Blu-ray," a sub-category of "DVDs," "Costumes," a sub-category of "Clothing & Accessories," etc. Each item category may have one or more sub-categories. Each sub-category may in turn have one or more sub-categories. An item offered by the electronic marketplace may be associated with one or more categories, and/or one or more sub-categories. As used herein, the term "clickstream data" refers to access history for a user utilizing a web site.

As part of a system or method for personalizing search results to a particular user, a keyword or keywords may be received via a search query interface. The keyword(s) may be used in a query to an inventory database which may return search results including information about items relating, at least to some extent, to the keyword(s). In some embodiments, each of the items in the search results is associated with one or more item categories. A blending algorithm may be used to order the search results into an order search result list personalized to the user. In various embodiments, information about the user's interests may be used to build an affinity between the user and a given item category. This information can be used to weight the blending algorithm to select items from an item category of most or more interest to the user.

In at least one embodiment, a system or entity, such as a provider of an electronic marketplace, may store and/or track global navigational data relating to clickstream data from the entirety, or some subset, of its users. The global navigational data may indicate, among other things, how users typically navigate the electronic marketplace given various stimuli and conditions. Additionally, the provider may store and/or track personal navigational data relating to individual user's clickstream data. The stored or tracked personal navigation data can be associated with a current session and/or gathered over time. Personal navigational data may also include, among other things, past purchase information and shopping cart activity information associated with a user.

The global navigational data and personal navigational data may be used to calculate a user-index affinity value indicating how alike an individual user is to an average user of the electronic marketplace. When the search is executed and a search result is returned with information about a number of items, a service may create an ordered search result list based on data such as (but not limited to) global navigational data, the personal navigational data, and the calculated user-index affinity value. In addition, in embodiments, the ordered search result set can be determined upon a quantification of how relevant an item is to the keyword, and a diversity value which represents an affinity for returning items from a diverse set of categories, if such items are available in the search results. For example, the diversity value may, as part of generation of an ordered result set, select an item from an item category based upon the last time an item of the item category was selected to be placed in an ordered search result list. It should be noted that any of the aforementioned calculations may occur at runtime or prior to startup.

Once all items in the search results, or at least some subset of the items, are scored, the ordered search result list may be presented to the user. For example, information (e.g., product description, price, availability, ratings, etc.) about each of the items in the ordered search list can be displayed to a user based upon the ordered search results list.

Thus, in accordance with embodiments, systems and methods are provided for providing a ordered search result list personalized to a user. Such systems and methods can be used, for example, in search engine environments, i.e., environments that are configured to generate search results in response to user input and/or query.

Referring now to the drawings, in which like reference numerals represent like parts, FIG. 1 illustrates an example of a search engine environment 100 in accordance with at least one embodiment. In the embodiment shown in FIG. 1, the search engine environment 100 is a web page on an electronic marketplace website 102, the website providing a search query interface 104. In accordance with embodiments, upon a user entering and submitting a keyword search via the search query interface 104, the user may be presented an ordered search result list 105 including, but not limited to, a list item 114, a list item 116, a list item 118, a list 120, a list item 122, and a list item 124. The ordered search result list 105 may be displayed in the search result pane 106. Information about the items, such as images, titles, descriptions, or other information can be displayed for the user in the search result pane 106. The items in the ordered search result list 105 displayed in the search result pane 106 are associated with various categories and sub-categories, which can be displayed as a list in an item category panel 108 of the website 102. For example, some of the items displayed in the ordered search result list 106 may be associated with a "Movies & TV" category 110. Further, the same or different item may be associated with "Blu-ray" 112, a sub-category of "Movies & TV."

Figure 2:
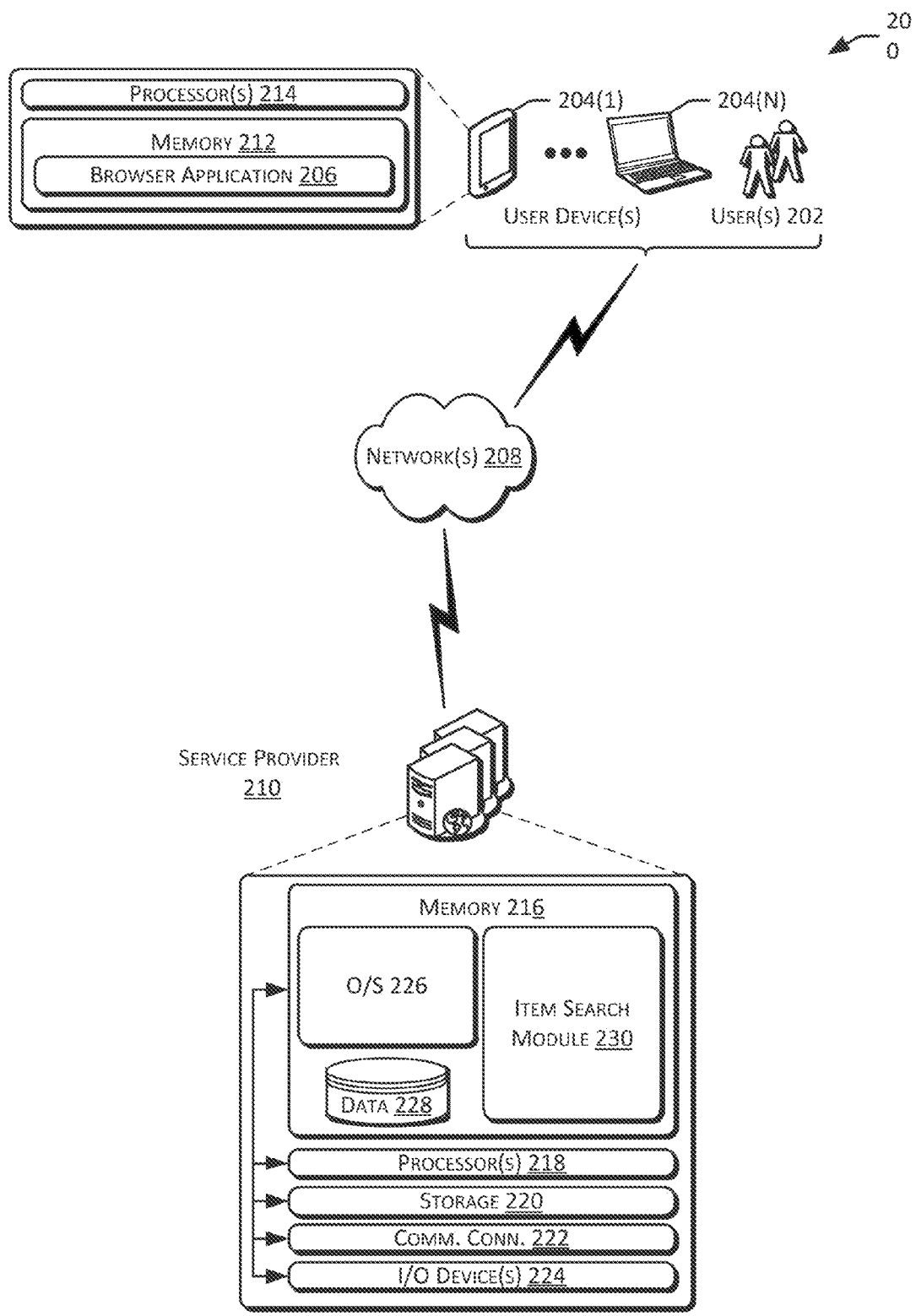
FIG. 2 illustrates an example architecture for providing an ordered search result list personalized to a user in accordance with at least one embodiment.

FIG. 2 depicts an illustrative system or architecture 200 for providing an ordered search result list 105 personalized to a user in accordance with at least one embodiment. In architecture 200, one or more users 202 (i.e., electronic marketplace consumers or web browser users) may utilize user computing devices 204(1)-(N) (collectively, user devices 204) to access a browser application 206 (e.g., a web browser or the electronic marketplace 100) or a user interface accessible through the browser application 206 via one or more networks 208. In some aspects, the browser application 206 may be hosted, managed, and/or provided by a computing resources service or service provider, such as by utilizing one or more service provider computers 210. The one or more service provider computers 210 may, in some examples, provide computing resources such as, but not limited to, client entities, low latency data storage, durable data storage, data access, management, virtualization, cloud-based software solutions, electronic content performance management, etc. The one or more service provider computers 210 may also be operable to provide web hosting, computer application development, and/or implementation platforms, combinations of the foregoing, or the like to the one or more users 202.

In some examples, the networks 208 may include any one or a combination of many different types of networks, such as cable networks, the Internet, wireless networks, cellular networks and other private and/or public networks. While the illustrated example represents the users 202 accessing the browser application 206 (e.g. browser applications such as SAFARI, FIREFOX, etc. or native applications) over the networks 208, the described techniques may equally apply in instances where the users 202 interact with the service provider computers 210 via the one or more user devices 204 over a landline phone, via a kiosk, or in any other manner. It is also noted that the described techniques may apply in other client/server arrangements (e.g., set-top boxes, etc.), as well as in non-client/server arrangements (e.g., locally stored applications, etc.).

As described briefly above, the browser application 206 may allow the users 202 to interact with the service provider computers 210 (e.g., via the electronic marketplace 100), such as to access information associated with items offered by the electronic marketplace. The one or more service provider computers 210, perhaps arranged in a cluster of servers or as a server farm, may host the browser application 206 and/or cloud-based software services. Other server architectures may also be used to host the browser application 206 and/or cloud-based software services. The browser application 206 may be capable of handling requests from many users 202 and serving, in response, various user interfaces that can be rendered at the user devices 204 such as, but not limited to perceived latency or the like. The browser application 206 can provide any type of website that supports user interaction, including search engine sites. As discussed above, the described techniques can similarly be implemented outside of the browser application 206, such as with other applications running on the user devices 204.

The user devices 204 may be any type of computing device such as, but not limited to, a mobile phone, a smart phone, a personal digital assistant (PDA), a laptop computer, a desktop computer, a thin-client device, a tablet PC, an electronic book (e-book) reader, etc. In some examples, the user devices 204 may be in communication with the service provider computers 210 via the networks 208, or via other network connections. Additionally, the user devices 204 may be part of the distributed system managed by, controlled by, or otherwise part of the service provider computers 210.

In one illustrative configuration, the user devices 204 may include at least one memory 212 and one or more processing units (or processor(s)) 214. The processor(s) 214 may be implemented as appropriate in hardware, computer-executable instructions, firmware, or combinations thereof. Computer-executable instruction or firmware implementations of the processor(s) 214 may include computer-executable or machine-executable instructions written in any suitable programming language to perform the various functions described.

The memory 212 may store program instructions that are loadable and executable on the processor(s) 214, as well as data generated during the execution of these programs. Depending on the configuration and type of user device 204, the memory 212 may be volatile (such as random access memory (RAM)) and/or non-volatile (such as read-only memory (ROM), flash memory, etc.). The user device 204 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 212 may include multiple different types of memory, such as static random access memory (SRAM), dynamic random access memory (DRAM), or ROM.

Turning to the contents of the memory 212 in more detail, the memory 212 may include an operating system and one or more application programs, modules, or services for implementing the features disclosed herein including at least the perceived latency, such as via the browser application 206 or dedicated applications (e.g., smart phone applications, tablet applications, etc.). The browser application 206 may be configured to receive, store, and/or display a website (e.g., the electronic marketplace 100), or other interface for interacting with the service provider computers 210. Additionally, the memory 212 may store access credentials and/or other user information such as, but not limited to, user IDs, passwords, and/or other user information. In some examples, the user information may include information for authenticating an account access request such as, but not limited to, a device ID, a cookie, an IP address, a location, or the like.

In some aspects, the service provider computers 210 may also be any type of computing devices such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the service provider computers are executed by one more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment. In some examples, the service provider computers 210 may be in communication with the user devices 204 and/or other service providers via the networks 208, or via other network connections. The service provider computers 210 may include one or more servers, perhaps arranged in a cluster, as a server farm, or as individual servers not associated with one another. These servers may be configured to implement the content performance management described herein as part of an integrated, distributed computing environment.

In one illustrative configuration, the service provider computers 210 may include at least one memory 216 and one or more processing units (or processor(s)) 218. The processor(s) 218 may be implemented as appropriate in hardware, computer-executable instructions, firmware, or combinations thereof. Computer-executable instruction or firmware implementations of the processor(s) 218 may include computer-executable or machine-executable instructions written in any suitable programming language to perform the various functions described.

The memory 216 may store program instructions that are loadable and executable on the processor(s) 218, as well as data generated during the execution of these programs. Depending on the configuration and type of service provider computers 210, the memory 216 may be volatile (such as RAM) and/or non-volatile (such as ROM, flash memory, etc.). The service provider computers 210 or servers may also include additional storage 220, which may include removable storage and/or non-removable storage. The additional storage 220 may include, but is not limited to, magnetic storage, optical disks and/or tape storage. The disk drives and their associated computer-readable media may provide non-volatile storage of computer-readable instructions, data structures, program modules and other data for the computing devices. In some implementations, the memory 216 may include multiple different types of memory, such as SRAM, DRAM, or ROM.

The memory 216, the additional storage 220, both removable and non-removable, are all examples of computer-readable storage media. For example, computer-readable storage media may include volatile or non-volatile, removable or non-removable media implemented in any method or technology for storage of information such as computer-readable instructions, data structures, program modules, or other data. The memory 216 and the additional storage 220 are all examples of computer storage media. Additional types of computer storage media that may be present in the service provider computers 210 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by the service provider computers 210. Combinations of any of the above should also be included within the scope of computer-readable media.

Alternatively, computer-readable communication media may include computer-readable instructions, program modules, or other data transmitted within a data signal, such as a carrier wave, or other transmission. However, as used herein, computer-readable storage media does not include computer-readable communication media.

The service provider computers 210 may also contain communications connection(s) 222 that allow the service provider computers 210 to communicate with a stored database, another computing device or server, user terminals and/or other devices on the networks 208. The service provider computers 210 may also include I/O device(s) 224, such as a keyboard, a mouse, a pen, a voice input device, a touch input device, a display, speakers, a printer, etc.

Turning to the contents of the memory 216 in more detail and will be described in further detail in FIG. 3, the memory 216 may include an operating system 226, one or more data stores 228, and/or one or more application programs, modules, or services for implementing the features disclosed herein including an all item search service.

Figure 3:
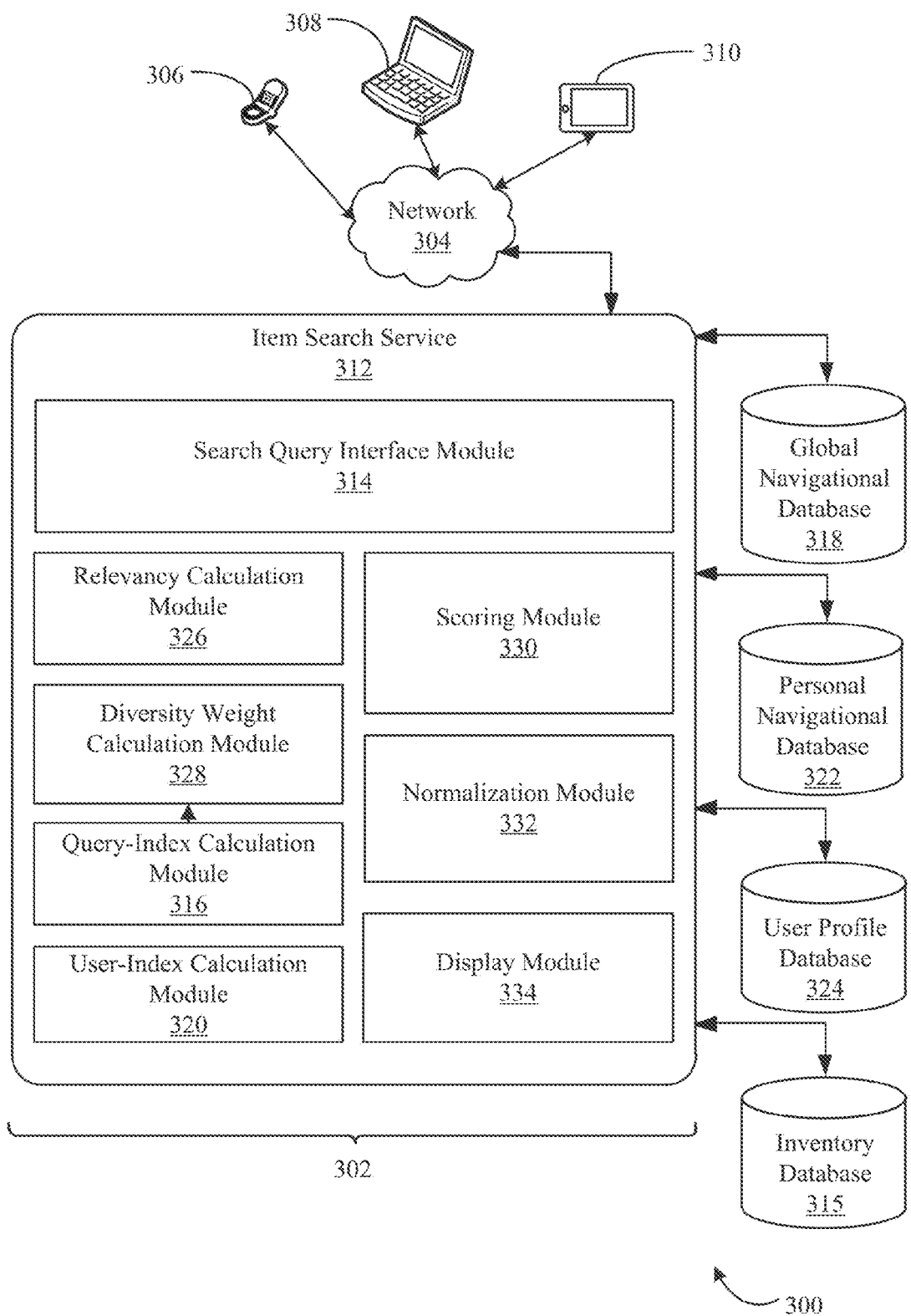
FIG. 3 schematically illustrates an example architecture for an item search service including a plurality of modules that may carry out various embodiments.

FIG. 3 schematically illustrates an example architecture 300 for an item search service including a plurality of modules 302 that may carry out various embodiments. The modules 302 may be software modules, hardware modules, or a combination thereof. If the modules are software modules, the modules can be embodied on a computer readable medium and processed by a processor in any of the computer systems described herein. It should be noted that the described processes and architectures described below can be performed either in real-time or in an offline mode prior to any user interaction. Additionally, any module or data store may be, in some embodiments, a service responsible for managing data of the type required to make corresponding calculations. The modules may be configured in the manner suggested in FIG. 3 or may exist as separate modules or services external to the Item Search Module 312.

In accordance with at least one embodiment, a method is enabled for blending items from search results associated with various categories into an ordered search result list 105, personalized for a particular user. For example, a user may enter and submit a keyword search query into a search engine interface (e.g., the search engine interface 104) via an electronic device (e.g., the user devices 204) communicating with a network 304. The network 304 may be the same or similar as the networks 208 described above. The electronic device may include, but is not limited to, a cell phone 306, a laptop computer 308, and a tablet personal computer 310, to name a few. One or more search results may be returned in response to the keyword search query. The search results may include various items and/or item identification numbers associated with the keywords that were submitted. In accordance with embodiments, each item in the search results is associated with at least one category or at least one sub-category.

The search results may be received by, for instance, an item search service 312 via a search query interface module 314. The search query interface module 314 may be responsible for receiving the keyword search query (e.g., from search query interface 104) and querying an inventory database 315 for items associated with the keyword search query. In at least one embodiment, the search query interface module 314 may execute one or many queries and/or service calls to one or many corresponding data stores or services responsible for storing or managing items in inventory. The search query interface module 314 may receive a set of organized search results or unorganized search results. If unorganized search results are received, the search query interface module 314 may organize the set of search results, for example in accordance with the categories that are associated with the items in the search results.

In at least one embodiment, a query-index calculation module 316 may be responsible for calculating a query-index affinity value based on stored and/or tracked Global Navigational Data (GND) 318. In at least one embodiment, the calculated query-index affinity value may be calculated prior to startup. Additionally, the GND used to generate the query-index affinity value may be loaded into local memory at startup. The query-index calculation module 316 may obtain GND from, for example, a global navigational database 318 responsible for storing data of this type. In general, GND is directed to information about multiple users and their interaction with the item search service 312. As an example, GND may include information associated with how often users of the website select an item from a particular item category or sub-category after issuing a particular keyword search and receiving search results responsive to the keyword search. Additionally, GND may include information associated with how often users of the website, overall, select various categories and sub-categories. GND can include, but is not limited to, clickstream data associated with all, or some subset, of users of the website. The query-index affinity value quantifies the frequency that a plurality of users will select an item in a particular item category subsequent to submitting a search query and receiving search results.

In at least one embodiment, a user-index calculation module 320 may be responsible calculating a user-index affinity value based on stored and/or tracked Personal Navigation Data (PND). The user-index calculation module 320 may obtain PND data from, for example, a personal navigational database 322 responsible for storing data of this type. PND may include information associated with the user's clickstream data, shopping cart additions, and/or past purchase information, as well as any historical or behavioral user information. The user-index affinity value quantifies the probability the user will select at least one of the multiple categories of items subsequent to entering a keyword search query and receiving search results. Once the user-index calculation module 320 analyzes the PND data, the analyzed data may be stored in a user profile database 324 to be used at a later point in time.

In at least one embodiment, a relevancy calculation module 326 may be responsible for quantifying an item's relevancy to a particular keyword search. Additionally, a diversity weight calculation module 328 may be responsible for tracking, during the generation of the ordered search result list 105, how frequently items associated with a category or sub-category are selected to be placed in the ordered search result list 105 as compared to items of other item categories or sub-categories. The diversity weight calculation module 328 can be configured to support diversity of item categories in the ordered search result list 105. As such, the diversity weight calculation module 328 can be configured to have an affinity for returning items from a diverse set of categories, if such items are available in the search results. For example, the diversity weight calculation module 328 may, as part of generation of an ordered search result list 105, bias the selection process to select an item from an item category based upon the last time an item of the item category was selected to be placed in an ordered search result list. If an item within a certain category has not been selected within a threshold amount of time, then the diversity module may influence selection of an item from that category. Furthermore, a scoring module 330 may be responsible for scoring items from the search results, selecting the highest scored item, and allocating the selected item a position in the ordered search result list. A normalization module 332 may be responsible for calculating and applying normalization values used to smooth global or personal data resulting from small data samples. A display module 334 may be responsible for causing the ordered search result list 105 to display for the user via one of the aforementioned electronic devices. The Item Search Service 312 may consist of the modules described or any combination thereof. The functionality of the modules may be implemented as described or by combining the modules in any combination.

Figure 4:
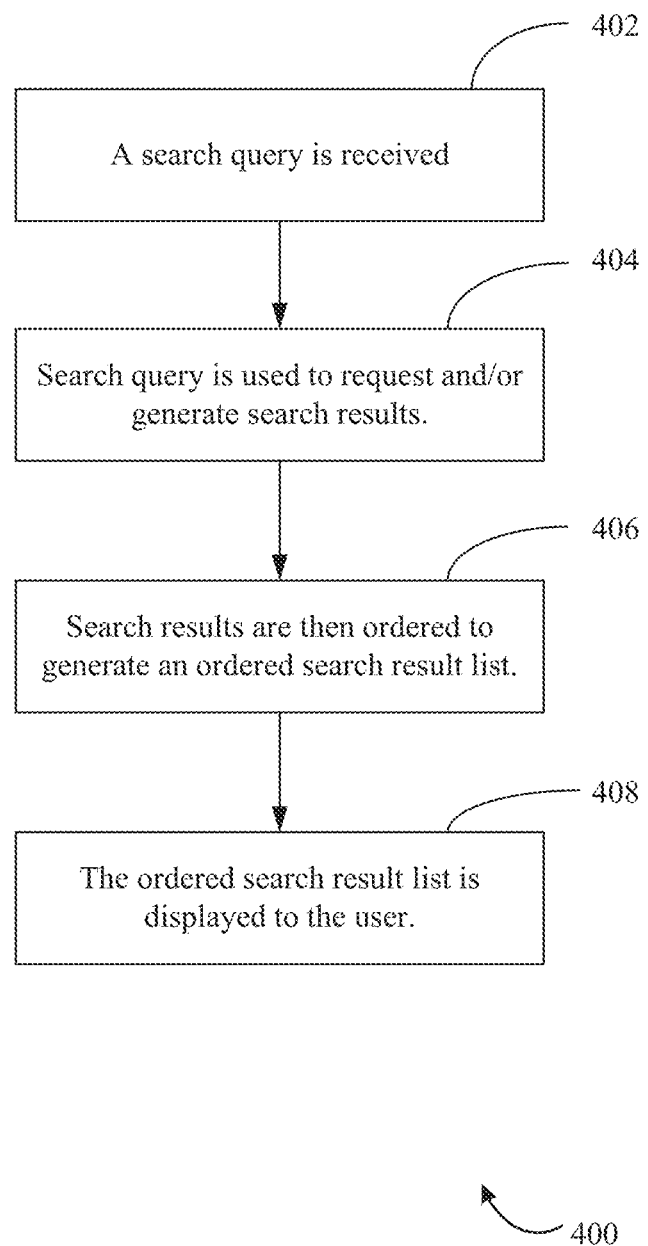
FIG. 4 is a flowchart representing a method for generating an ordered search result list in accordance with embodiments.

FIG. 4 is a flowchart representing a method 400 for generating an ordered search result list in accordance with embodiments. Beginning at 402, a search query is received, for example by the search query interface module 314. The search query can come, for example, from a user who enters a keyword search query via the search query interface 104.

At 404, the keyword search query is used by the search query interface module 314 to request and/or generate, for example, from the inventory database 315, search results including information about items associated with the keyword. The determination that the items may be associated with the keyword may be performed with various known database query techniques. The inventory database 315 may then return the search results list to the search query interface module 314 organized in any fashion, though one example organization is by category. In at least one embodiment, search results may include a list of item identification numbers. The item identification numbers may be used to retrieve data associated with the items from databases and/or services responsible for managing such data. The search results may also include data associated with the items, making further queries or calls to obtain data unnecessary.

The search results are then ordered by the Item Search Service 312 to generate an ordered search result list at 406. This ordered search result list can then be provided to the user, for example for display, at 408. For example, in the example shown in FIG. 1, the first position in the ordered search result list 106 is a blu-ray DVD entitled "Harry Potter and the Sorcerer's Stone" 114, associated with the "Movies & TV" category and "Blu-ray" sub-category.

The ordered search result list can be formed in a number of ways, and many examples are provided herein. Items can be selected by applying the data stored and/or tracked by the various modules described above with respect to the Item Search Service 312. Specifically, items can be selected for ordering by using GND, PND, relevancy and/or diversity data. As an example, a scoring process can be used, and the items can be presented for ordering in accordance with their scores. Once the items are scored, the item with the highest score may be selected and allocated a position in the ordered search result list. If no items have been allocated a position in the list previously, the first item allocated a position will be allocated the first position in the ordered search result list. The selected item may be removed from the search results and the next topmost item in the selected item's category may become the new top item of that category. That new top item will then be scored as described above. The top items that were not selected will be allotted a diversity weight value of, for example, 1. The diversity weight value indicates how many selections have occurred since an item of the item's category was last selected to be in the ordered result list. This number is indexed by one (1) each time an item is selected other than the item being indexed. A higher number indicates that it has been a while since the category has been used, and this higher number can be used to override a higher score so the results have more diversity of categories.

The Item Search Service 312, or some module of the service, will continue to pick items with the highest score, allocating them positions in the ordered search result list, recursively, until a suitable number of items, which may be all items, have been scored and allocated a position in the ordered search result list. The ordered search result list may then be displayed to the user, for example, via a web page on one of the aforementioned electronic devices. Although a particular method for selecting items to allocate positions in an ordered search result list is described above, various methods may be employed to achieve the desired ordering.

Figure 5:
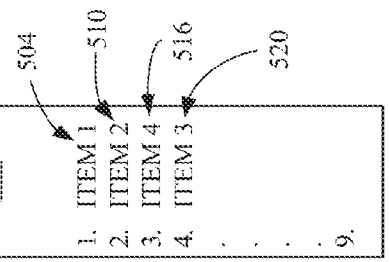
FIGS. 5A-5F illustrates a series of block diagrams representing an example process for allocating a position in an ordered search result list to items of various categories in accordance with at least one embodiment.

FIGS. 5A-5F illustrate a series of block diagrams representing an example process for allocating a position in an ordered search result list to items of various categories in accordance with at least one embodiment. For example, a user may enter a keyword search query to the aforementioned Item Search Service 312. The search query interface module 314 may receive the keyword and query the inventory database 315 to obtain items associated with the keyword search query. Consider the example in which the user enters a keyword search query of "Harry Potter" and nine items are returned, as depicted in FIG. 5A. Each of the nine example items is associated with a category, namely "Blu-ray," "Children's Books," "Costumes," and "Posters & Prints," for example. The search query interface module will order the items in the various categories, maintaining the original order that the items were in when obtained from the inventory database 315, as depicted in FIG. 5A.

The top items in each category, namely item 1, item 2, item 3 and item 4, are scored based on at least GND and PND as described above. The item with the highest score, in this example item 1 as depicted in FIG. 5A, is selected and allocated the first position 504 in the ordered search result list 501. Item 1 is removed from the search result list and item 5 becomes the new top item in the Blu-ray category, as depicted in FIG. 5B. Item 5 is then scored and the items not selected, namely item 2, item 3 and item 4, are assigned a diversity weight of 1, as seen FIG. 5B.

The top items are rescored to calculate an overall score, the overall score including the original score plus the diversity weight. In this example, item 2 contains the highest overall score of 98 as depicted FIG. 5C. Thus, item 2 is selected and allocated the second position 510 in the ordered search result list 501. Item 2 is removed from the search result list and item 6 becomes the new top item in the Books category, as depicted FIG. 5D. Item 6 is then scored and the items not selected, namely item 5, item 3 and item 4, have their corresponding diversity weights incremented by 1, as seen FIG. 5D.

The top items are rescored to calculate an overall score, the overall score including the original score plus the diversity weight. In this example, item 4 contains the highest overall score of 98 as depicted FIG. 5E. Thus, item 4 is selected and allocated the third position 516 in the ordered search result list 501. Item 4 is removed from the search result list as depicted FIG. 5E. Though not depicted, the remaining top items that were not selected, namely item 5, item 6 and item 3, have their corresponding diversity weights incremented by 1.

The top items are rescored to calculate an overall score, the overall score including the original score plus the diversity weight. As depicted in FIG. 5F, item 3, with a score of 92, diversity weight of 3, for an overall score of 95, is the highest scored item for this round. The diversity weight is intended to allow items associated with categories that are relatively unlikely to be of interest to the user a chance at being included in the ordered search result list 501. Thus, due to the diversity weight, item 3 is selected and allocated the fourth position 520 in the ordered search result list 501. Item 3 is then removed from the search result list. This process described above will continue recursively until a suitable number of items have been ordered, or all 9 items have been allocated a position in the ordered search result list 501. As can be understood, ordering can continue in a background process while some of the first ordered items are displayed or otherwise provided to the user.

Figure 6:
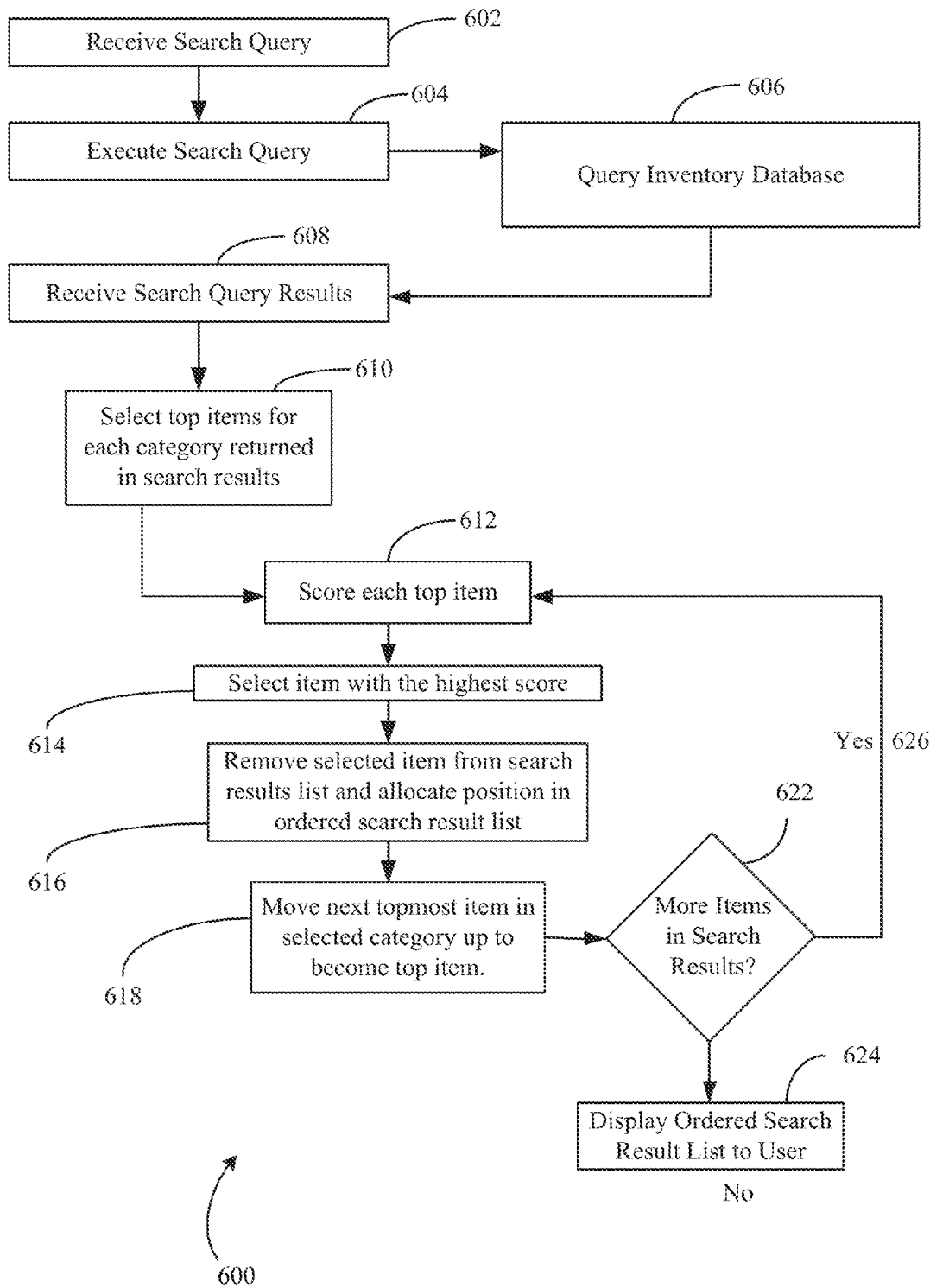
FIG. 6 is a flowchart illustrating a method for determining an ordered search result list in accordance with at least one embodiment.
Figure 7:
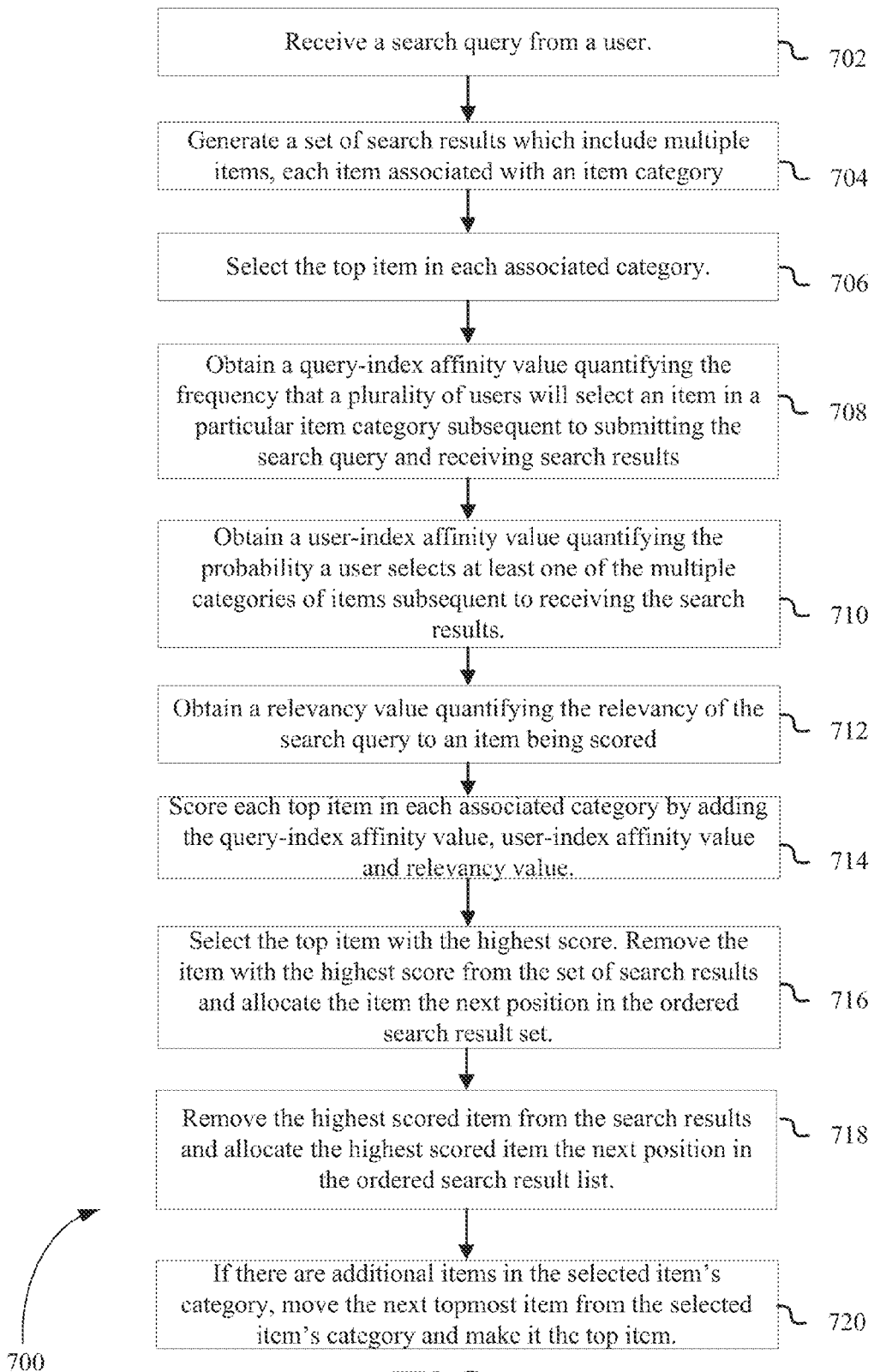
FIG. 7 is a flowchart illustrating a method for determining an ordered search result list in accordance with at least one other embodiment.
Figure 8:
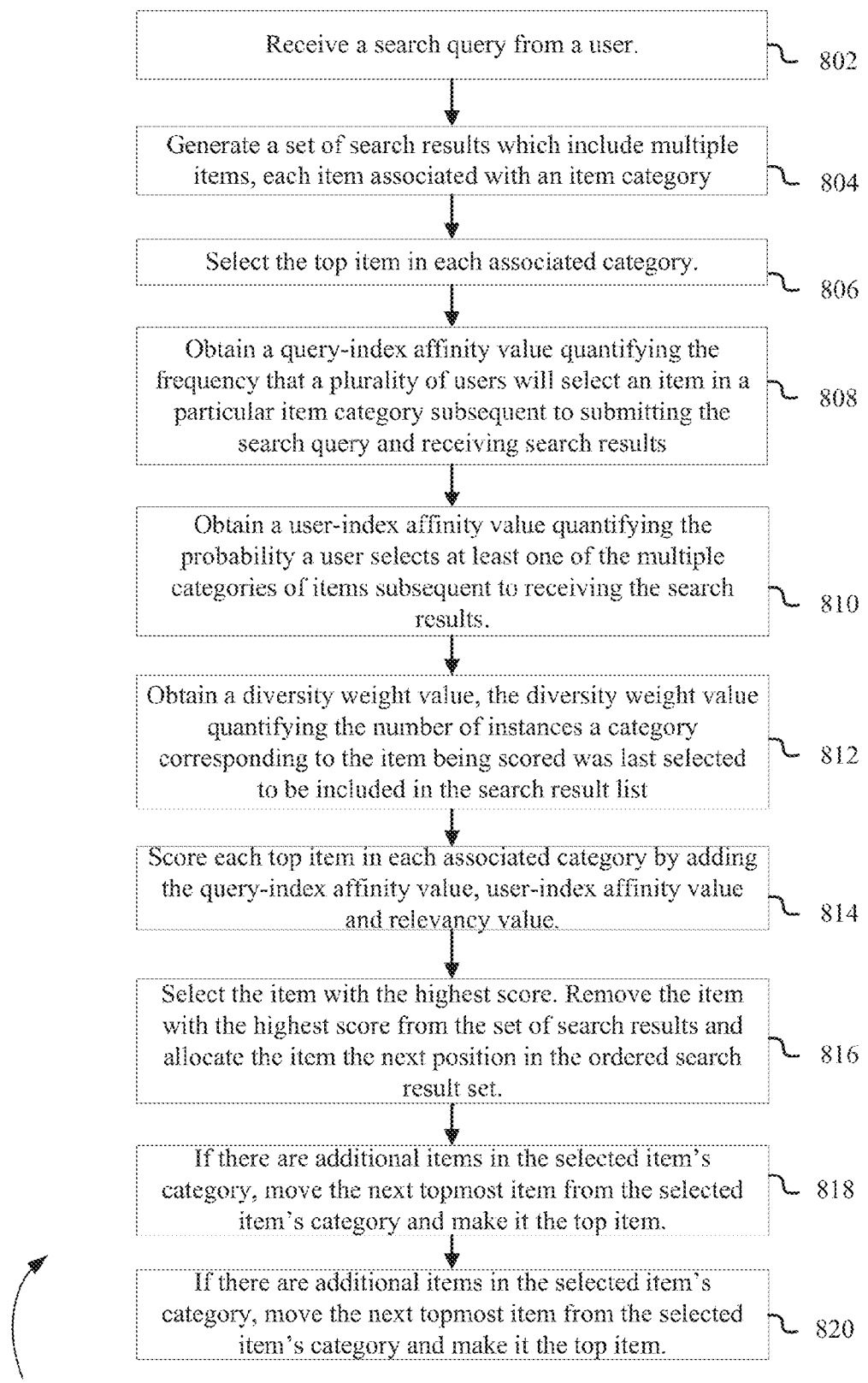
FIG. 8 is a flowchart illustrating a method for determining an ordered search result list in accordance with at least one still further embodiment.

FIGS. 6-8 illustrate example flow diagrams showing respective processes 600, 700 and 800 for determining an ordered search result list, in accordance with embodiments. These processes and the process 400 are illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer executable instructions include routines, programs, objects, components, data structures and the like that perform particular functions or implement particular data types. The order in which the operations are described is not intended to be construed as a limitation, and any number of the described operations can be combined in any order and/or in parallel to implement the processes.

Additionally, some, any, or all of the processes (or any other processes described herein, or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. As noted above, the code may be stored on a computer-readable storage medium, for example, in the form of a computer program comprising a plurality of instructions executable by one or more processors. The computer-readable storage medium may be non-transitory.

In at least one embodiment, the process 600 may begin at 602, where a search query is received, for example from a user submitting the search query via the search query interface 104. The search query may be received, for example, by the Item Search Service 314. The search query may be executed (e.g., by the Item Search Service 312 or Search Query Interface Module 314) at 604 which queries the inventory database 315 at 606. The inventory database 315 contains, at least, items associated with various item categories and keywords. The search results are generated or received at 608, for example by the Item Search Service 312 or Search Query Interface Module 314. If not previously sorted by category, the search results are sorted by category by the Search Query Interface Module 314. The top items in each category are selected at 610. In one embodiment, the top items are selected based on a string comparison between information associated with the item and the search query keyword(s). A degree of high similarity between the two will result in a high relevancy determination. The most relevant, in this example, may be considered the top item. Though this example is based on a string comparison, it should be noted that any appropriate comparison technique may be used to rank the items in each category in some order. Each top item is scored at 612. In at least one embodiment, the top items can be scored according to the following formula:

$$score = \alpha * \log(QIA_{cand} * UIA_{cand}) + \beta * rel_{cand} + \gamma * div_{cand}$$

where $\alpha$, $\beta$, and $\gamma$ represent scaling normalization variables used to scale the remaining variables to roughly the same range, $QIA_{cand}$ represents a query-index affinity value quantifying the frequency that a plurality of users will select an item in a particular item category subsequent to submitting the search query and receiving search results. In one embodiment, $QIA_{cand}$ may be calculated by the query-index calculation module 316. $UIA_{cand}$ represents a user-index affinity value quantifying the probability the user selects at least one of the multiple categories of items subsequent to receiving the search results. In one embodiment, $UIA_{cand}$ may be calculated by the user-index calculation module 320. $rel_{cand}$ represents a relevancy value quantifying the relevancy of the search query to an item being scored. In one embodiment, $rel_{cand}$ may be calculated by the relevancy calculation module 326. Finally, $div_{cand}$ represents a diversity value quantifying the number of instances a category corresponding to the item being scored was last selected to be included in the search result list. In at least one embodiment, $div_{cand}$ may be calculated by the diversity weight calculation module 328. The $UIA_{cand}$ value, in at least one embodiment may be calculated by the following formula:

$$UIA_{cand} = (A_{clicks} + \mu)/(E_{clicks} + \mu)$$

where $A_{clicks}$ is the actual number of user clicks in a given item category, $E_{clicks}$ is the expected number of user clicks in a given category in light of the global navigational data, and is a manually-tuned regularization normalization variable used to compensate for small data samples.

The ordered search result list is then generated utilizing the process described with FIGS. 5A-5F. The item with the highest score may be selected at 614. That item may be removed from the search result list and allocated a position in the ordered search result list at 616. The next topmost item in the selected category may then be moved up a position in the category, becoming the new topmost item for the category at 618. Each subsequent item in the category may also be moved up a position in the category. A determination as to whether there are more items in the search results that have not been allocated a position in the ordered search result list is made at 622. If there are more items in the search results that have not been allocated a position in the ordered search result list, 622 branches back to 612, and 612-618 are repeated for each item left in the search results. Once all items in the search result list have been allocated a position in the ordered search result, 622 branches to 624, where the ordered search result list may be displayed to the user.

FIG. 7 is a flowchart illustrating an example method for determining an ordered search result list in accordance with at least one embodiment. In at least one embodiment, the process 700, may begin at 702, where a search query is received from a user by the search query interface module 314. The search query interface module 314 may generate or otherwise obtain a set of search results which include multiple items, each item associated with an item category, at 704, the set of search results obtained from the inventory database 315 containing, at least, items associated with various item categories and keywords. The search results are received and the top item in each category is selected at 706. A query-index affinity value is calculated at 708 by the query-index calculation module 316, the value quantifying the frequency that a plurality of users will select an item in a particular item category subsequent to submitting the search query and receiving search results. The query-index affinity value is calculated from analyzing stored and/or tracked GND obtained from the global navigational database 318 corresponding to a plurality of users' clickstream data. Specifically, GND may indicate how often, in general, users of the electronic marketplace select categories. Additionally, GND may indicate how often, users of the electronic marketplace select an item of an item category subsequent to submitting the search query and receiving search results.

In at least one embodiment, a user-index affinity value is calculated at 710 by the user-index calculation module 320, the value quantifying the frequency that a particular user will select an item in a particular item category subsequent to submitting the search query and receiving search results. The user-index affinity value is calculated from analyzing stored and/or tracked PND obtained from the personal navigational database 322 corresponding to the user's clickstream data. PND may also include shopping cart activity and past purchase history associated with the user. Specifically, PND may indicate how often, in general, the user select categories of items. Additionally, PND may be used, along with GND to quantify a similarly between the user and plurality of users.

A relevancy value is calculated at 712 by the relevancy calculation module 326. The relevancy value quantifies the relevancy of the search query to an item being scored. Various methods may be used to quantify the relevancy of the search query to the item being scored, these methods are known to ones skill in the art of search engines.

The top item in each category represented by the search results is scored by adding the query-index affinity value, the user-index affinity value and the relevancy value at 714. Of the top items, the highest scored item is selected at 716. The highest scored top item is removed from the search results and allocated the next position in the ordered search result list at 718. If no items have been allocated to the ordered search result list, then the first highest scored top item may be allocated the first position in the ordered search result list.

In some embodiments, if there are additional items in the selected item's category, the next topmost item will be moved up and become the top item of that category at 720. Any additional items remaining in the category will also move up a position in the category. Steps 706-720 will be repeated until all items from the set of search results are allocated a position in the ordered search result list. When all items have been allocated a position, the ordered search result list may be displayed to the user via an electronic device.

FIG. 8 is a flowchart illustrating another example method for determining an ordered search result list in accordance with at least one embodiment. In at least one embodiment, the process 800, may begin at 802, where a search query is received from a user by the search query interface module 314. The search query may obtain a set of search results which include multiple items, each item associated with an item category, at 804, the set of search results obtained from the inventory database 315 containing, at least, items associated with various item categories and keywords. The search results are received and the top item in each category is selected at 806. A query-index affinity value is calculated at 808 by the query-index calculation module 316, the value quantifying the frequency that a plurality of users will select an item in a particular item category subsequent to submitting the search query and receiving search results. The query-index affinity value is calculated from analyzing stored and/or tracked GND obtained from the global navigational database 318 corresponding to a plurality of users' clickstream data. Specifically, GND may indicate how often, in general, users of the electronic marketplace select categories. Additionally, GND may indicate how often, users of the electronic marketplace select an item of an item category subsequent to submitting the search query and receiving search results.

In at least one embodiment, A user-index affinity value is calculated at 810 by the user-index calculation module 320, the value quantifying the frequency that a particular user will select an item in a particular item category subsequent to submitting the search query and receiving search results. The user-index affinity value is calculated from analyzing stored and/or tracked PND obtained from the personal navigational database 322 corresponding to the user's clickstream data. PND may also include shopping cart activity and past purchase history associated with the user. Specifically, PND may indicate how often, in general, the user select categories of items. Additionally, PND may be used, along with GND to quantify a similarly between the user and plurality of users.

In at least one embodiment, a diversity weight value is calculated at 812 by the diversity weight calculation module 328. The diversity weight value quantifies the number of instances a category corresponding to the item being scored was last selected to be included in the search result list. Diversity weight values may be used to ensure that items whose categories are less likely to be of interest to the user, may nonetheless, at some point, appear in the ordered search result list. A relatively low scored item based on GND and PND, may at some point, be selected as the highest score due to a high diversity value indicating that the item's category had been passed over many times.

In at least one embodiment, the top item is scored by adding the query-index affinity value, the user-index affinity value and the diversity weight value at 814. Of the top items, the highest scored item is selected at 816. The highest scored top item is removed from the search results and allocated the next position in the ordered search result list at 818. If no items have been allocated to the ordered search result list, then the first highest scored top item may be allocated the first position in the ordered search result list.

In some embodiments, if there are additional items in the selected item's category, the next topmost item will be moved up and become the top item of that category at 820. Any additional items remaining in the category will also move up a position in the category. Steps 806-818 will be repeated until all items from the set of search results are allocated a position in the ordered search result list. When all items have been allocated a position, the ordered search result list may be displayed to the user via an electronic device.

Figure 9:
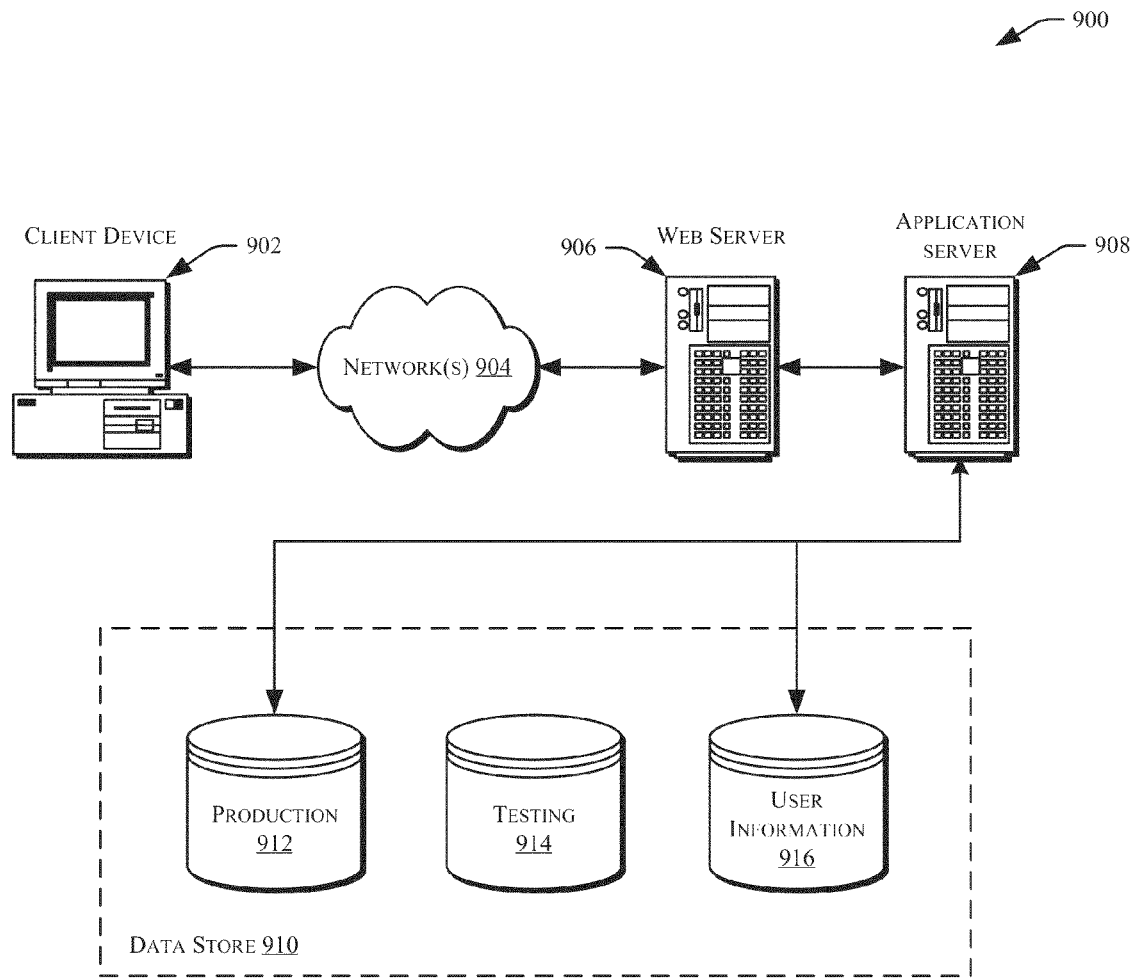
FIG. 9 illustrates an environment in which various embodiments can be implemented.

FIG. 9 illustrates aspects of an example environment 900 for implementing aspects in accordance with various embodiments. As will be appreciated, although a Web-based environment is used for purposes of explanation, different environments may be used, as appropriate, to implement various embodiments. The environment includes an electronic client device 902, which can include any appropriate device operable to send and receive requests, messages or information over an appropriate network 904 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 906 for receiving requests and serving content in response thereto, although for other networks an alternative device serving a similar purpose could be used as would be apparent to one of ordinary skill in the art.

The illustrative environment includes at least one application server 908 and a data store 910. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio and/or video to be transferred to the user, which may be served to the user by the Web server in the form of HyperText Markup Language (HTML), Extensible Markup Language (XML) or another appropriate structured language in this example. The handling of all requests and responses, as well as the delivery of content between the client device 902 and the application server 908, can be handled by the Web server. It should be understood that the Web and application servers are not required and are merely example components, as structured code discussed herein can be executed on any appropriate device or host machine as discussed elsewhere herein.

The data store 910 can include several separate data tables, databases or other data storage mechanisms and media for storing data relating to a particular aspect. For example, the data store illustrated includes mechanisms for storing production data 912 and user information 916, which can be used to serve content for the production side. The data store also is shown to include a mechanism for storing log data 914, which can be used for reporting, analysis or other such purposes. It should be understood that there can be many other aspects that may need to be stored in the data store, such as for page image information and to access right information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 902. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as Transmission Control Protocol/Internet Protocol (TCP/IP), Open System Interconnection (OSI), File Transfer Protocol (FTP), Universal Plug and Play (UpnP), Network File System (NFS), Common Internet File System (CIFS) and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including Hypertext Transfer Protocol (HTTP) servers, FTP servers, Common Gateway Interface (CGI) servers, data servers, Java servers and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory (EEPROM), flash memory or other memory technology, Compact Disc Read-Only Memory (CD-ROM), digital versatile disk (DVD) or other optical storage, magnetic cassettes, magnetic tape, magnetic disk storage or other magnetic storage devices or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method for determining item placement in a search result set on a web page, comprising:
   under the control of one or more computer systems configured with executable instructions,
   receiving a search query from a user;
   executing the search query to generate a set of search results, the set of search results including information about a plurality of items, each of the plurality of items being related to at least one item category of a plurality of item categories;
   for each of the plurality of item categories represented by the set of search results, selecting a top item of an item category;
   determining a user-index affinity value for each top item, wherein the user-index affinity value quantifies a probability for each of the plurality of item categories that the user selects the item category subsequent to receiving the set of search results;
   determining a query-index affinity value for each top item, wherein the query-index affinity value quantifies a frequency that a plurality of users will select an item in a particular item category subsequent to submitting the search query and receiving search results related to the particular item category;
   determining a diversity weight value for each top item, wherein the diversity weight value quantifies a number of instances an item category corresponding to the top item being scored was last selected to be included in a search result list;
   calculating a score for each of the top items based at least in part on the user-index affinity value, the query-index affinity value, and the diversity weight value;
   determining an ordered search result set, based at least in part on the score for each of the top items; and
   providing the ordered search result set based at least in part on the score for each of the top items.

2. The computer-implemented method of claim 1, wherein the determining the ordered search result set further comprises:
   calculating the score for each of the top items of each of the item categories, and then recursively:
      selecting one top item based at least in part on the calculated score;
      allocating a position in the ordered search result set to the selected one top item;
      removing the selected one top item from the set of search results;
      determining a new top item for the category associated with the selected one top item; and
      calculating a new score for the new top item.

3. The computer-implemented method of claim 2, wherein the allocating a position in the ordered search result set is recursively accomplished until every item in the search results is allocated a position in the ordered search result set.

4. A computer-implemented method for determining item placement in a search result list on a web page, comprising:
   under the control of one or more computer systems configured with executable instructions,
   receiving a search query from a user;
   obtaining a set of search results based upon the search query, the set of search results including information about a plurality of items, each of the plurality of items being related to at least one item category of a plurality of item categories; and
   calculating a score for each of the plurality of items, wherein calculating the score for each of the plurality of items is calculated by the formula:

$$\text{score} = \alpha * \log(\text{QIA}_{cand} * \text{UIA}_{cand}) + \beta * \text{rel}_{cand} + \gamma * \text{div}_{cand}$$

where $\alpha$, $\beta$, and $\gamma$ are scaling normalization variables, wherein $\text{QIA}_{cand}$ is a query-index affinity value, wherein $\text{UIA}_{cand}$ is an user-index affinity value that quantifies a probability value for each item category of the plurality of item categories that the user will select that item category subsequent to receiving the search results, wherein the probability value is calculated based at least in part on a comparison of stored personal navigational data to stored global navigational data, wherein the $rel_{cand}$ is a relevancy value, and wherein the $div_{cand}$ is a diversity weight value that quantifies the number of instances a category corresponding to a current item being scored was last selected to be included in the ordered search result list; and ordering the set of search results to create an ordered search result set based at least in part on the score for each of the plurality of items.

5. The computer-implemented method of claim 4, wherein the ordering of the set of search results to create the ordered search result set is further based at least in part on the stored global navigational data that quantifies a frequency that a plurality of users will select an item in a particular item category subsequent to submitting the search query and receiving the set of search results.

6. The computer-implemented method of claim 5, wherein the stored global navigational data includes information associated with search query submissions by the plurality of users and the plurality of users' clickstream data subsequent to the search query submissions.

7. The computer-implemented method of claim 5, wherein the stored global navigational data includes recent and old clickstream data by the plurality of users, the recent clickstream data weighted more heavily than the old clickstream data in the ordering of the set of search results.

8. The computer-implemented method of claim 7, wherein the ordering of the set of search results to create the ordered search result set is further based at least in part on calculating a relevancy value, the calculation of the relevancy value including at least comparing the search query to information associated with the item.

9. The computer-implemented method of claim 4, wherein the ordering of the set of search results to create the ordered search result set is further based at least in part on the stored personal navigational data.

10. The computer-implemented method of claim 4, wherein the user-index affinity value is calculated at least by:
obtaining a session clickstream data value associated with the user indicating a frequency the user selects each of the plurality of item categories during the session;
obtaining global category information value indicating a frequency that the plurality of users selects each of the plurality of item categories; and
dividing the session clickstream data value by the global category information value.

11. The computer-implemented method of claim 4, wherein the user-index affinity value is calculated at least by the formula:

$$UIA_{cand} = (A_{clicks} + \mu)/(E_{clicks} + \mu)$$

where $A_{clicks}$ is an actual number of user clicks in a given item category, $E_{clicks}$ is an expected number of user clicks in the given category in light of the global navigational data, and $\mu$ is a manually-tuned regularization normalization variable used to compensate for small data samples.

12. The computer-implemented method of claim 4, wherein calculating the score is based at least in part on clickstream data from the plurality of users and the user.

13. The computer-implemented method of claim 4, wherein the stored personal navigational data includes clickstream data associated with the user, the clickstream data associated with a current session.

14. The computer-implemented method of claim 4, wherein calculating the score for each of the plurality of item categories further comprises utilizing normalization variables to adjust for small data samples.

15. A system for determining item placement in an ordered search result list on a web page, comprising:
a device processor; and
a memory device including instructions that, when executed by the device processor, cause the system to:
receive a search query from a user;
execute the search query to generate a set of search results from a search query, the set of search results including a plurality of items, each of the plurality of items being related to at least one item category of a plurality of item categories;
for each of the plurality of item categories represented by the search results, selecting a top item of the item category;
determine a query-index affinity value for each top item, wherein the query-index affinity value quantifies a frequency that a plurality of users will select an item in a particular item category subsequent to submitting the search query and receiving search results related to the particular item category;
determine a user-index affinity value for each top item, wherein the user-index affinity value quantifies a probability for each of the plurality of item categories that the user selects the item category subsequent to receiving the search results;
determine a diversity weight value for each top item, wherein the diversity weight value quantifies a number of instances an item category corresponding to the top item being scored was last selected to be included in the search result list;
calculate a score for each of the top items based at least in part on the user-index affinity value, the query-index affinity value, and the diversity weight value;
determine an ordered search result set, based at least in part on the score for each of the top items; and
provide the ordered search result set to the user based at least in part on the calculated score for each of the top items.

16. The system of claim 15, wherein the calculated diversity weight provides for an item with relatively little popularity as compared to other items in the search results to be included in the search results list and displayed to the user.

17. The system of claim 15, wherein the user-index affinity value is based at least in part on stored personal navigational data corresponding to clickstream data associated with the user, the personal navigation data collected over a period of time.

18. The system of claim 15, wherein the user-index affinity value is based at least in part on the identity of the user.

19. The system of claim 15, wherein the determination of the score is based at least in part on assigning a probability of interest in a set of categories using a Latent Dirichlet Allocation formula.

20. A non-transitory computer-readable storage medium storing instructions for determining item placement in a search result list on a web page, the instructions when executed by a processor cause the processor to:
receive a search query from a user; and
execute the search query to generate a set of search results, the search results including information about a plurality of items, each of the plurality of items being related to at least one item category of a plurality of item categories;

for each of the plurality of item categories represented by the search results, select a top item of the item category;

determine a user-index affinity value for each top item, wherein the user-index affinity value quantifies a probability for each of the plurality of item categories that the user selects the item category subsequent to receiving the search results;

determine a query-index affinity value for each top item, wherein the query-index affinity value quantifies a frequency that a plurality of users will select an item in a particular item category subsequent to submitting the search query and receiving search results related to the particular item category;

determine a diversity weight value for each top item, wherein the diversity weight value quantifies a number of instances an item category corresponding to the top item being scored was last selected to be included in a search result list;

calculate a score for each of the top items based at least in part on the user-index affinity value, the query-index affinity value, and the diversity weight value;

determine an ordered search result set, based at least in part on the score for each of the top items; and providing the ordered search result set based at least in part on the score for each of the top items.

21. The non-transitory computer-readable storage medium of claim 20, wherein calculating the score is further based at least in part on stored user profile data.

22. The non-transitory computer-readable storage medium of claim 20, wherein calculating the score is further based at least in part on a determination of relevancy between the search query and the categories associated with each of the plurality of items.

* * * * *